Jan. 29, 1952   J. C. FISK   2,583,936
DISTRIBUTOR CONTACT POINT GAUGE
Filed Oct. 14, 1949
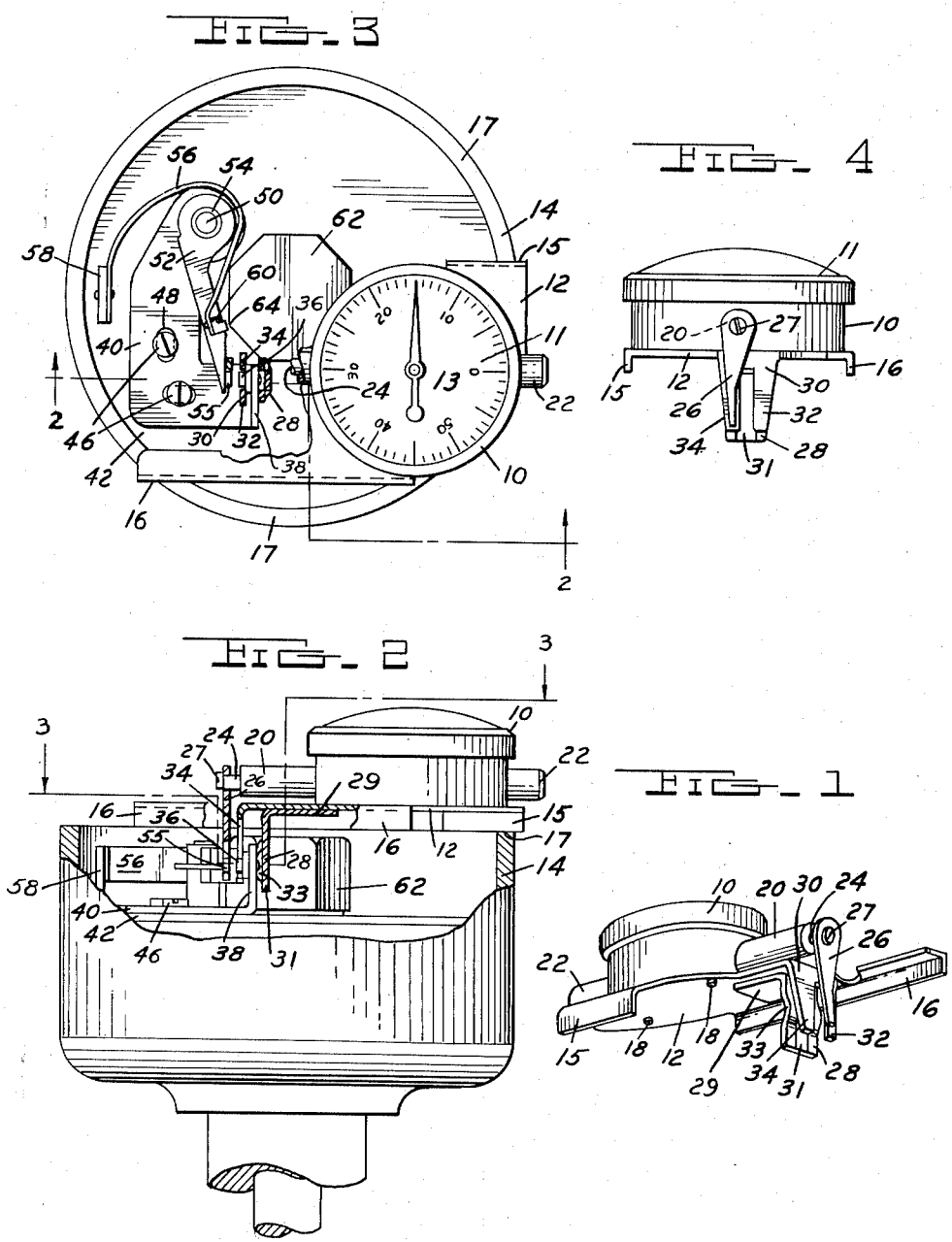
INVENTOR.
JAMES C. FISK
BY
Burton & Parker
ATTORNEYS Patented Jan. 29, 1952

2,583,936

UNITED STATES PATENT OFFICE 2,583,936

DISTRIBUTOR CONTACT POINT GAUGE

James C. Fisk, Flint, Mich.

Application October 14, 1949, Serial No. 121,319

4 Claims. (Cl. 33—181)

This invention relates to testing instruments and particularly to a device or instrument for measuring the gap between the contact points of an ignition distributor of an internal combustion engine.

In measuring the gap between the contact or breaker points of a distributor, it is common practice for the mechanic to insert a feeler gauge between the points when they are fully open. This requires careful manipulation. Also if the contact points have become pitted or worn so that one point is convex and the other correspondingly concave, the feeler gauge will not accurately indicate the actual gap between the points or the distance one point moves away from the other. It will indicate rather the shortest distance between the points which may be the apex of one point and the offset perimeter of another.

An important object of this invention is to provide a gauge which will accurately measure the gap between the contact or breaker points of an ignition distributor. It is designed to give a reading based upon the distance the movable contact point of an ignition distributor moves with respect to the relatively stationary contact point of such distributor.

Another object of this invention is to provide a gauge constructed in such a manner as to be capable of being so mounted upon the distributor that the gap between the contact points may be so adjusted while the gauge remains in place, so that after relative adjustment of the contact points has been made resetting or repositioning of the gauge upon the distributor to check such adjustment is unnecessary.

A further object is to provide a gauge capable of being so mounted that it will give a continuous progressive reading while adjustment of the gap between the contact points is in progress.

An additional object of the invention is a gauge capable of being so mounted upon the distributor that it will progressively indicate a developing contact point gap as the distributor is advanced or retarded relative to the normal firing position of the pistons within the cylinders of the engine.

A further object of the present invention is the provision of a gap indicator gauge that is capable of being positioned upon the distributor as hereinabove described, by supporting the gauge shiftably upon the distributor casing and positioning the same thereon by engagement with the stationary contact point.

Various other objects, advantages, and meritorious features will become more fully apparent from the following specification, claims and accompanying drawing, wherein:

Fig. 1 is a perspective view of the gauge;

Fig. 2 is a side view of the gauge illustrating the method of positioning it upon the stationary contact point and the engagement of the contact finger with the movable contact arm as shown in section along line 2—2 of Fig. 3;

Fig. 3 is a top view of the gauge as shown in Fig. 1 and the manner of mounting it upon the distributor with a sectional view taken along line 3—3 of Fig. 2; and Fig. 4 is a front view of the gauge, its frame and its contact finger.

Referring in detail to the drawings, the numeral 10 indicates a dial indicator of a standard type calibrated to read in thousandths of an inch or a comparative system of measurement. Said indicator is mounted upon a spring metal frame or base 12 which is adapted to be supported upon the distributor housing 14 by oppositely extending parallel shoulders or skids 15 and 16. These skids 15 and 16 are adapted to support the indicator assembly upon the margin 17 of a conventional distributor housing 14. These skids are formed by bending down two of the opposite marginal edges of the frame. Screws 18 secure the dial indicator 10 to the frame 12.

Referring now to Figs. 2 and 4, the dial indicator 10 has two cylindrical protrusions 20 and 22. Cylinder 22 carries within it a spring (not shown) outwardly urging a plunger 24 journalled within the cylinder 20. The spring and the plunger are conventional elements of a standard dial indicator of the type shown. The plunger 24 has a flat triangularly shaped finger 26 fitted over its outlying end and held thereon by any suitable means such as a screw 27. The finger 26 need not be necessarily of the shape shown, but may be formed in any shape that will facilitate its use in the operation of the indicator.

A spring clamp is formed by cooperating depending portions 28 and 30 of the frame 12. Portion 30 is forked having two tines indicated by numerals 32 and 34. These tines, when the gauge assembly is inserted in its functional position upon the distributor housing, as shown in Figs. 2 and 3, bracket the contact point 36 of the distributor and lie against the upstanding lug 38 supporting the contact point which together constitute the stationary contact.

The depending shoulder portion 28 is formed by a right angularly bent metal strip fastened by its leg 29 to the frame 12. The shoulder 28, thus formed, is recessed as at 31 and bowed out slightly as at 33. When the gauge assembly is in its functional position, as in Figs. 2 and 3, shoulder 28 engages the back side of lug 38 of the distributor.

Fork 30 and shoulder 28, disposed as described and illustrated, form a spring clamp which serves to embrace the stationary contact point 36 and grippingly engage the lug 38. As a result of this gripping action of the spring clamp, frame 12 and the indicator assembly mounted thereon are fixedly positioned relative to the contact point 36. By virtue of this they are further adjustably positioned relative to the distributor housing for reasons hereinafter to be disclosed.

Said upstanding lug 38 is a marginal right angularly upwardly bent portion of plate 40. This plate is adjustably slidably supported upon the distributor floor 42 and normally held thereagainst by screw 46. Cam 48 is employed to adjustably position the plate. Plate 40 is also journalled upon the upstanding pin 50 for limited swingable movement thereabout.

A contact or breaker arm 52 made of electrically conductible material is journalled substantially above plate 40 upon pin 50 and insulated therefrom by suitable material as illustrated by reference numeral 54. A contact or breaker point 55 is fastened to the free end of this breaker or contact arm. A spring 56 fastened at one end by lug 58 upstanding from the distributor floor, passes around the fulcrum end of arm 52 and engages lug 60 upstanding therefrom. Lug 60 also acts as a cam follower. The spring thereby serves to normally hold arm 52 through lug 60 in contact with cam 62.

With the gauge in functional position as shown in Figs. 2 and 3, the narrow portion of finger 26 embraces contact point 55 and bears adjacent thereto against the breaker arm 52. Rotatable movement of cam 62 increases and decreases the distance between breaker points 55 and 36 and actuates finger 26 thereby operating the dial indicator 10.

If a particular gap between said points is desired, as when the points are at their maximum gap opening during rotation of the cam, the gauge assembly is first installed upon and within the distributor housing as shown and described. The cam 62 is rotated until the breaker points are in contact with one another. The dial face 11 is then rotated (as it may be in this standard type of indicator) until the pointer 13 movably connected with plunger 24 registers with the zero marking on the dial face. The cam is then rotated until a high point of the cam such as 64 lies beneath the cam follower 60. If the movement away from the stationary contact point just made by the movable contact point arm and recorded by pointer 13, is not of a distance to afford the gap that is desired, screw 46 is loosened and plate 40 carrying upstanding lug 38 and contact point 36 is adjustably positioned with respect to contact point 55 by rotation of cam 48 and screw 46 may then be retightened.

Repositioning of plate 40 carrying upstanding lug 38 and point 36, by virtue of the above mentioned spring clamp, serves also to reposition the gauge assembly over the distributor housing. This is accomplished by having the gauge slidably supported upon the housing and positioned respective thereto by the engagement of the spring clamp and of the contact point 36.

Therefore, it may be seen that adjustment of the gap between the contact points is accomplished while the gauge assembly is in its functional position on the distributor, and that the dial indicator affords a continuous reading of the progressive adjustment of the contact points.

What I claim is:

1. A gauge for determining contact point gap in an ignition distributor having a housing and an upstanding lug normally stationary but adjustable and mounting a contact point, and a movable arm mounting a contact point, comprising in combination a frame, a dial indicator mounted thereupon, said frame defining a flat central portion receiving the indicator and marginal depending parallel shoulder portions extending in opposite directions on each side of the gauge, said shoulders adapted to rest slidably upon said housing and support the gauge, said frame provided with a depending spring clamp comprising cooperating substantially parallel spaced apart portions adapted to grippingly engage opposite sides of the upstanding lug provided with the stationary contact, one of said portions being in the form of a fork adapted to bracket the contact carried by the lug, the other portion being in the form of a flat spring deformed on its face adjacent to the lug to engage such side of the lug, said indicator provided with a finger disposed beyond the spring clamp and adapted to engage the movable contact to be actuated thereby.

2. A gauge for determining contact point gap in an ignition distributor having a housing surrounding an interior portion, said interior portion provided with an upstanding normally stationary lug adjustable thereover within the housing and having a contact point projecting from one side of the lug and provided with a pivoted arm having a contact point spring urged toward the contact point of the lug; comprising in combination a frame, a dial indicator mounted upon the frame, said frame defining skid portions adapted to seat slidably bridgingly upon the housing, said frame provided intermediate the ends of the skids with a depending clamp comprising cooperating substantially parallel spaced apart portions adapted to grippingly engage opposite sides of the lug positioning the gauge upon the housing for slidable adjustment of its skids over the housing upon adjustment of the lug within the housing, said portion of the clamp engaging the contact point side of the lug being forked with the forks thereof engaging the lug upon opposite sides of the contact point, said indicator provided with a plunger projecting outwardly beyond the clamp substantially normal to the plane of the clamp and having a finger depending substantially parallel to the plane of the clamp adapted to engage the pivotally supported arm.

3. A gauge for determining contact point gap in an ignition distributor having a housing surrounding an interior portion, which interior portion is provided with an upstanding lug fixed thereto and adjustable thereover within the housing and having contact point fixed to one side thereof, and is provided with an arm pivoted thereto and having a contact point opposed to the contact point of the lug and spring urged thereagainst; comprising in combination a frame, a dial indicator mounted upon the frame, said frame defining skid portions adapted to seat slidably bridgingly upon the housing and provided intermediate the ends of the skid portions with a depending clamp having cooperating substantially parallel spaced apart portions adapted to engage opposite sides of the lug to position the gauge upon the housing for slidable adjustment of its skids over the housing upon adjustment of the lug upon the interior portion within the housing, said indicator provided with a plunger extending outwardly beyond the clamp substantially normal to the plane thereof and having a finger depending substantially parallel to the plane of the clamp adapted to engage the pivotally supported arm, said plunger being spring urged to hold its finger against said arm.

4. A gauge for determining contact point gap in an ignition distributor having a housing surrounding an interior portion, which interior portion is provided with an upstanding lug fixed thereto and adjustable thereover within the housing and having contact point fixed to one side thereof, and is provided with an arm pivoted thereto and having a contact point opposed to the contact point of the lug and spring urged thereagainst; comprising in combination a frame, a dial indicator mounted upon the frame, said frame defining skid portions adapted to seat slidably bridgingly upon the housing and provided intermediate the ends of the skid portions with a depending clamp having cooperating substantially parallel spaced apart portions adapted to engage opposite sides of the lug to position the gauge upon the housing for slidable adjustment of its skids over the housing upon adjustment of the lug upon the interior portion within the housing, that portion of the clamp engaging the contact point side of the lug having a thickness such that the contact point projects outwardly therebeyond, said indicator provided with a plunger projecting outwardly beyond the clamp substantially normal to the plane thereof and having a finger depending substantially parallel to the plane of the clamp spaced therefrom a distance less than the distance to the adjacent end of the skids and adapted to engage the pivotally supported arm, said plunger being spring urged to hold its finger against said arm.

JAMES C. FISK.

REFERENCES CITED

The following references are of record in the file of this patent:

UNITED STATES PATENTS

| Number | Name | Date |
| --- | --- | --- |
| 1,243,545 | Nefedov | Oct. 16, 1917 |
| 1,825,988 | Wochner | Oct. 6, 1931 |
| 1,911,442 | Earl | May 30, 1933 |
| 2,458,344 | Carroll | Jan. 4, 1949 |

FOREIGN PATENTS

| Number | Country | Date |
| --- | --- | --- |
| 143,747 | Switzerland | Feb. 2, 1931 |